US010310588B2

(12) United States Patent
Varma et al.

(10) Patent No.: US 10,310,588 B2
(45) Date of Patent: *Jun. 4, 2019

(54) FORCING CORE LOW POWER STATES IN A PROCESSOR

(71) Applicant: Intel Corporation, Santa Clara, CA (US)

(72) Inventors: Ankush Varma, Hillsboro, OR (US); Krishnakanth V. Sistla, Beaverton, OR (US); Allen W. Chu, Portland, OR (US); Ian M. Steiner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,096

(22) Filed: Oct. 18, 2016

(65) Prior Publication Data

US 2017/0102752 A1 Apr. 13, 2017

Related U.S. Application Data

(63) Continuation of application No. 13/972,569, filed on Aug. 21, 2013, now Pat. No. 9,495,001.

(51) Int. Cl.
*G06F 1/26* (2006.01)
*G06F 1/32* (2019.01)
(Continued)

(52) U.S. Cl.
CPC ............ *G06F 1/3287* (2013.01); *G06F 1/266* (2013.01); *G06F 1/3293* (2013.01);
(Continued)

(58) Field of Classification Search
CPC ...... G06F 1/266; G06F 1/3287; G06F 1/3293; G06F 1/3296; G06F 9/4893; Y02D 10/122; Y02D 10/172; Y02D 50/20
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003
WO 2009120427 10/2009

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Abdelmoniem I Elamin
(74) *Attorney, Agent, or Firm* — Trop, Pruner & Hu, P.C.

(57) ABSTRACT

In an embodiment, a processor includes a plurality of cores each to independently execute instructions, a power delivery logic coupled to the plurality of cores, and a power controller including a first logic to cause a first core to enter into a first low power state of an operating system power management scheme independently of the OS, during execution of at least one thread on the first core. Other embodiments are described and claimed.

17 Claims, 11 Drawing Sheets

(51) Int. Cl.
  *G06F 1/3287* (2019.01)
  *G06F 1/3293* (2019.01)
  *G06F 1/3296* (2019.01)
  *G06F 9/48* (2006.01)

(52) U.S. Cl.
  CPC .......... *G06F 1/3296* (2013.01); *G06F 9/4893* (2013.01); *Y02D 10/122* (2018.01); *Y02D 10/172* (2018.01); *Y02D 50/20* (2018.01)

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,174,469 B2 | 2/2007 | Luick |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,596,705 B2* | 9/2009 | Kim ...................... G06F 1/3203 712/28 |
| 7,730,340 B2 | 6/2010 | Hu et al. |
| 8,661,279 B2 | 2/2014 | Goodrum |
| 8,711,653 B2 | 4/2014 | Nayak |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0154931 A1* | 7/2005 | Oh ...................... G06F 1/3203 713/300 |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0123521 P1 | 6/2006 | Nakajima et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156370 A1* | 7/2007 | White ...................... G06F 1/206 702/132 |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0168287 A1* | 7/2008 | Berry ...................... G06F 1/266 713/323 |
| 2008/0244285 A1 | 10/2008 | Fleming |
| 2008/0250260 A1* | 10/2008 | Tomita ................. G06F 1/3203 713/324 |
| 2009/0006871 A1 | 1/2009 | Liu et al. |
| 2009/0150695 A1 | 6/2009 | Song et al. |
| 2009/0150696 A1 | 6/2009 | Song |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0246506 A1 | 9/2012 | Knight |
| 2012/0309468 A1* | 12/2012 | King ................. H04W 52/0251 455/574 |
| 2013/0024708 A1 | 1/2013 | Goodrum |
| 2013/0007494 A1 | 3/2013 | Branover et al. |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0113444 A1* | 5/2013 | Schrom ................... H02M 1/14 323/247 |
| 2013/0147446 A1* | 6/2013 | Kris .......................... G06F 1/26 323/273 |
| 2013/0300386 A1* | 11/2013 | Priel ..................... G11C 5/147 323/274 |
| 2013/0346774 A1 | 12/2013 | Bhandaru et al. |
| 2014/0068290 A1 | 3/2014 | Bhandaru et al. |
| 2014/0189413 A1 | 7/2014 | Hasenplaugh |
| 2014/0195829 A1 | 7/2014 | Bhandaru et al. |
| 2014/0208141 A1 | 7/2014 | Bhandaru et al. |
| 2014/0250442 A1 | 9/2014 | Reinhardt |
| 2014/0281625 A1 | 9/2014 | Younger |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

(56) References Cited

OTHER PUBLICATIONS

Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 42 pages.
European Search Report dated Jan. 8, 2015, in European Patent Application No. 14180539.0.
European Patent Office, Office Action dated Dec. 18, 2017, in European Patent Application No. 14180539.0.
European Patent Office, Office Action dated Oct. 24, 2018 in European Patent Application No. 14180539.0.

\* cited by examiner

FORCING CORE LOW POWER STATES IN A PROCESSOR

This application is a continuation of U.S. patent application Ser. No. 13/972,569, filed Aug. 21, 2013, now U.S. Pat. No. 9,495,001, the content of which is hereby incorporated by reference.

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

The power dissipation of a processor depends heavily on activity level, workload, temperature, operating frequency and other runtime variables. In addition to a single thermal design point (TDP) limit at which a processor can operate, a processor also provides a running average power limit (RAPL) feature. This feature can be used by customers to increase rack compute density (in the case of servers), battery life (in the case of client systems) or other power/performance/thermal constraints. However, available power saving techniques lose their efficiency as operating parameters are reduced.

DETAILED DESCRIPTION

Embodiments may widen a dynamic range of power consumption (and consequently power conservation) by a processor according to several mechanisms. First, forced core low power state duty cycling may be implemented, which forces entry into given inactive low power states even when a core is active, instead of performing frequency-only scaling or clock throttling. Second, power constrained core scaling may be implemented in which an operating system (OS) is requested by, e.g., hardware or firmware, to reduce an active core count in order to meet power constraints. These two orthogonal approaches may be used in conjunction to increase the available dynamic range of power.

In various embodiments these power management techniques may be performed internally within a processor and independently of an OS. As one example, a power controller of a processor such as a power control unit may force one or more cores to enter into a given low power state, e.g., responsive to one or more processor operating metrics, which operations may occur transparently to an OS. Or in other situations, this controller may signal the OS that one or more cores are to be placed into an offline condition in which workloads are not to be scheduled to the core, which similarly enables entry of the core into an appropriate low power state, but with OS visibility.

Figure 1A:
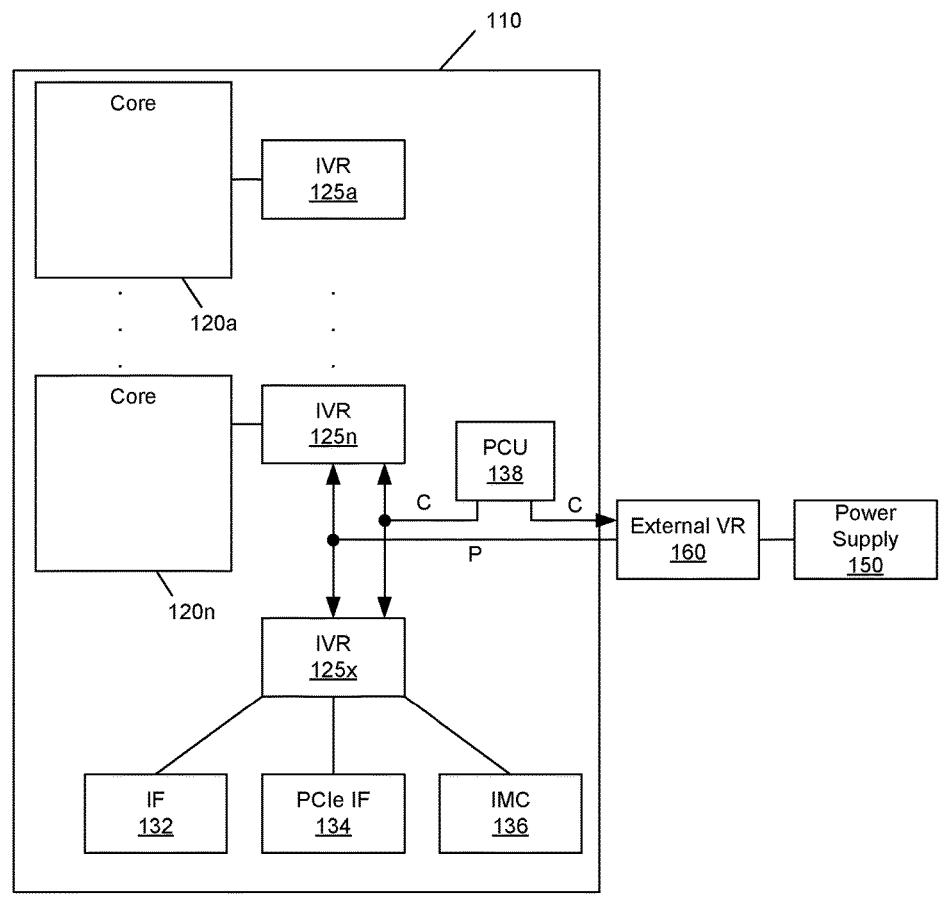
FIG. 1A is a block diagram of a portion of a system in accordance with an embodiment of the present invention.

Referring now to FIG. 1A, shown is a block diagram of a portion of a system in accordance with an embodiment of the present invention. As shown in FIG. 1A, system 100 may include various components, including a processor 110 which as shown is a multicore processor. Processor 110 may be coupled to a power supply 150 via an external voltage regulator 160, which may perform a first voltage conversion to provide power in the form of a primary regulated voltage to processor 110.

As seen, processor 110 may be a single die processor including multiple cores $120_a$-$120_n$. In addition, each core may be associated with an integrated voltage regulator (IVR) $125_a$-$125_n$ which received this primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1A, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to cause one or more cores to perform forced low power duty cycling, as well as interfacing with an OS to request core scaling in power-constrained conditions.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1A with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the forced low power state duty cycling described herein may be independent of and complementary to an OS-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). A C-state is typically entered by a core when it is idle, meaning no workload is being executed. In this state, power to the entire core is typically switched off, realizing both zero dynamic and leakage power. In a C-state, a core has zero net performance and negligible power consumption. One example deep low power state is a C6 state in which power to a core is greatly reduced to a zero or negligible amount, as power to a core in a C6 state is turned off e.g., via the corresponding IVR or a power gate circuitry.

Typically a processor can take three main actions to reduce power to within a limit, depending on the current zone of operation: voltage-frequency scaling (via P-states); frequency-only scaling (also via P-states); and clock duty cycling (via throttling (T)-states). For voltage-frequency scaling, when an operating voltage is above a minimum voltage level (Vmin), the processor can reduce both voltage and frequency to reduce power. Since dynamic power is given by $P=cv^2F$, where P is power, C is capacitance, V is voltage and F is frequency, and voltage and frequency are roughly linear above Vmin, this results in a cubic reduction in power for each step down in frequency. Leakage power is also reduced by a similar factor depending on the process technology because of the voltage decreases. As such, voltage-frequency scaling is very performance efficient, since each drop in frequency/performance results in a cubic decrease in power.

Once voltage-frequency scaling reaches Vmin, further voltage decreases are not possible. However, frequency alone can be decreased using frequency-only scaling further until a minimum operating frequency, Fmin, is reached. This kind of power scaling is relatively inefficient: dynamic power drops linearly with frequency and leakage power remains constant (since it depends on voltage, not frequency). Clock duty cycling (T-states) typically occurs once the operating frequency has reached Fmin, as further frequency reduction is no longer possible due to design constraints. Below this point, power reductions can be realized by duty cycling clock signals in the processor. Like frequency-only scaling, this is also inefficient. Using forced C-state control and/or core offlining described herein, embodiments enable greater power savings than frequency-only scaling and clock duty cycling, particularly as newer generations of processors operate closer to Vmin and Fmin.

Figure 1B:
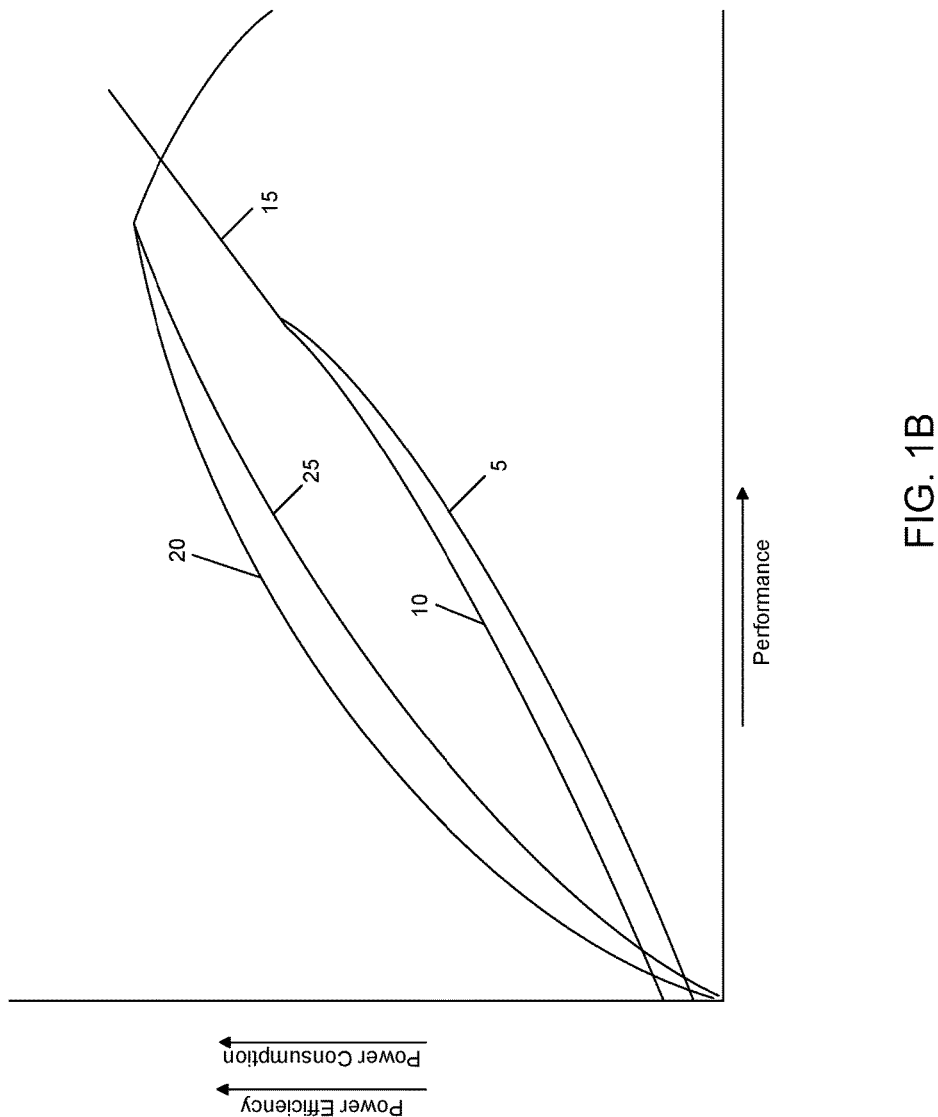
FIG. 1B is a graphical illustration of power consumption versus performance for a variety of power management techniques.

Referring now to FIG. 1B, shown is a graphical illustration of power consumption and power efficiency versus performance for a variety of power management techniques. V-f scaling as represented at curve 15 is the most efficient scaling above the Pn/Vmin point. Below that point, frequency-only scaling as represented by a higher portion of curve 10 may be performed, followed by T-state operation as represented by a lower portion of curve 10 once frequency-only scaling runs out. Instead, using an embodiment of the present invention, forced core C-state duty cycling and power-constrained core scaling may be performed as represented at curve 5 when v-f scaling is no longer possible to provide much more efficient power scaling below the Pn/Vmin point, as well as providing greater dynamic range of power control. As seen at curve 20, this control provides greater efficiency than at curve 25 realized by frequency-only scaling and T-states. Forced C-state operation may occur periodically during operation as appropriate to efficiently extend RAPL dynamic range.

Figure 2:
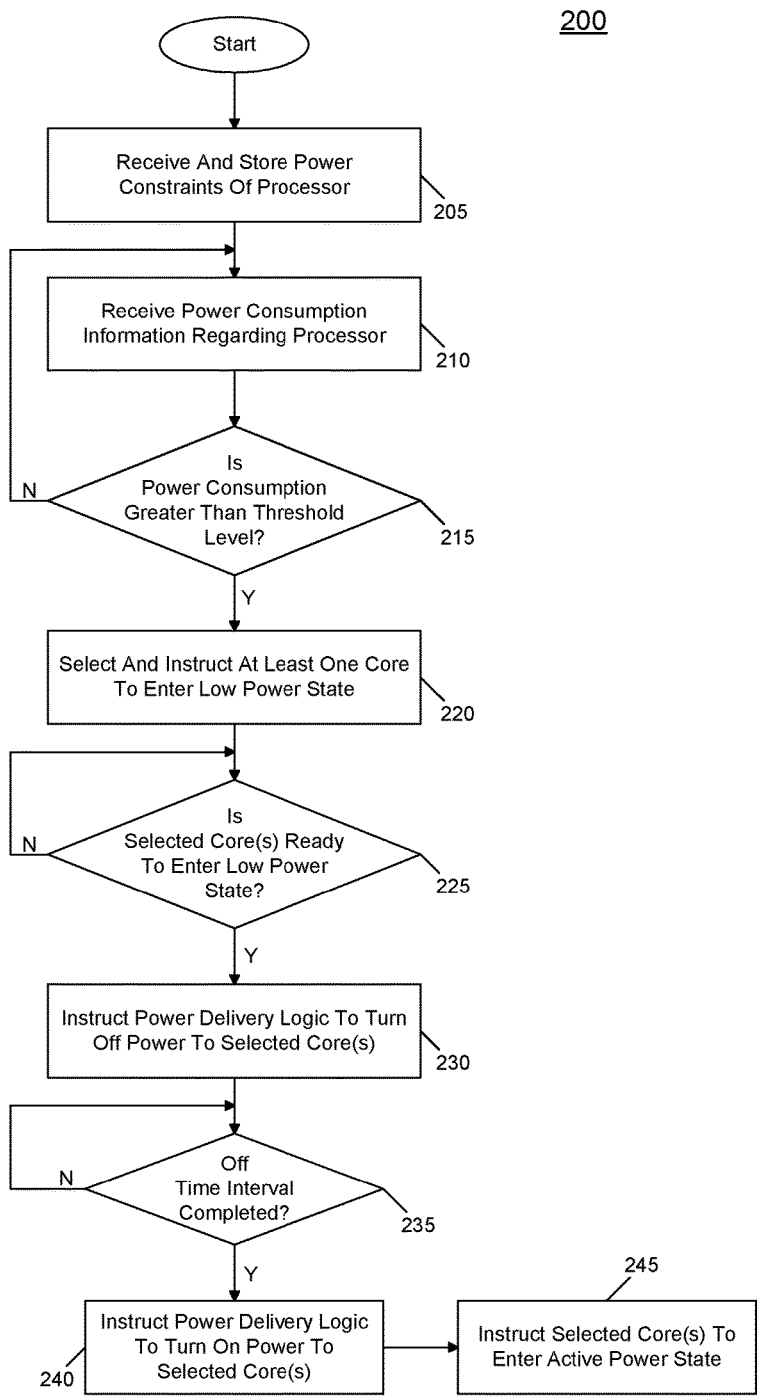
FIG. 2 is a flow diagram of a method for performing forced low power state control in accordance with an embodiment of the present invention.

Referring now to FIG. 2, shown is a flow diagram of a method for performing forced low power state control in accordance with an embodiment of the present invention. As shown in FIG. 2, method 200 may be performed by power control circuitry of a processor such as a PCU to realize forced C-state transitions as described. As seen in FIG. 2, method 200 begins by receiving and storing power constraints of a processor (block 205). Note that such constraints may be provided on initialization of the processor. These constraints may further be updated during operation as appropriate. Examples of such power constraints include thermal constraints such as a thermal design power (TDP) limit, a power consumption limit which may be a maximum power consumption level allowed during operation, among other such constraints. Note that these constraints, which may be programmed by BIOS or other system software, may be stored in one or more configuration storages of the PCU such as configuration registers, in an embodiment.

Still referring to FIG. 2, control passes next to block 210 where during normal operation power consumption information may be received. Although the scope of the present invention is not limited in this regard this power consumption information, e.g., in the form of current delivered, may correspond to a level of power being consumed within the processor. As an example, this power consumption information may be provided from the external voltage regulator on a regular basis, e.g., approximately several times per millisecond (ms). Next it may be determined whether the power consumption of the processor is greater than a threshold level (diamond 215). In one implementation this threshold level may correspond to one or more of the power constraints of the processor. Or a threshold level can be set based on a combination of such constraints. If the power consumption that is being incurred is not greater than the threshold level, control passes back to block 210 to await receipt of a next iteration of power consumption analysis.

Otherwise, if it is determined that the power consumption is greater than a given threshold level, control passes back to block 220. At block 220 at least one core may be selected for entry to a given C-state. For purposes of discussion here, assume that a single core is selected for entry into a C-state; however it is possible for multiple cores to be selected for C-state entry. The selection of an appropriate core for C-state entry may be based on work being performed in each core. For example, the core that is undertaking the least amount of work may be selected. In other cases, an explicit indication of a core, e.g., based on a priority level for the associated core, may be used to select the core for C-state entry. In any event, the selected core is instructed to enter into the appropriate low power state.

Control passes to diamond 225 to determine whether this core is ready to enter the low power state. Note that upon instruction by the PCU to enter into a low power state, the core may undertake appropriate activities to prepare for entry into the low power state. Although the scope of the present invention is not limited in this regard, these measures include completing all remaining work scheduled to it, shutting down appropriate circuitry, and finally sending an indication to the PCU that the core may be powered down. Thus at this time, control passes from diamond 225 to block 230 where power delivery logic may be instructed to turn off power to the selected core. Various power delivery logic such as an internal voltage regulator within the core may be present in certain embodiments, and the PCU may send a control signal to this logic to cause the regulator to be turned off. In other instances, a control signal may be provided, e.g., to an external voltage regulator, to cause that voltage regulator to no longer provide an operating voltage to the selected core. Thus at this time the selected core enters into the appropriate low power state. Note that this state may last for at least a predetermined interval. Although the scope of the present invention is not limited in this regard, in an embodiment the C-state may occur for a duration at least approximately 0.1 ms.

Still referring to FIG. 2, control passes next to diamond 235 where it can be determined how long to maintain a core in a forced C-state. When this forced C-state entry is determined to be completed at diamond 235, control passes to block 240 where the power delivery logic may be instructed to turn on power to the selected core. Then at block 245, the selected core is instructed to enter an active power state. Thus at this time, the core is fully enabled and can begin again performing useful work, e.g., by restoring previously stored state and configuring execution of a thread. That is, this forced C-state duty cycling may be performed transparently to the OS and other system software. Note that although shown at this high level in the embodiment of FIG. 2, understand the scope of the present invention is not limited in this regard and many variations are possible.

An alternative (and complementary) approach to forced C-state operation is to request the OS to reduce the number of active cores, instead of forcing all cores to enter C-states periodically. For example, in an 8-core processor, 4 cores may be placed into a deep C-state and the remaining 4 cores are maintained active, rather than attempting a 50% C-state duty cycle on all 8 cores.

In an embodiment, core offlining may occur in a power-constrained environment. Here the PCU provides a signal to the OS, e.g., via hints, to indicate that a certain core (or cores) should be taken offline. This communication may be done through a per-core register that is OS-readable and PCU-writable. This register, e.g., a machine specific register (MSR), indicates whether a given core is to be taken offline due to power constraints. In one example, a MSR may indicate that a core has very low productivity (for example, by indicating that it has zero performance scalability, zero available cycles, etc.) to provide an indication to the OS that a core should be taken offline.

When the OS sees that a given core is to be taken offline, it takes several actions. First, it stops scheduling further work on that core. If possible, the executing thread on that core is migrated to another core. When done, the OS requests C-state entry for that core to cause the PCU to take power saving actions to effect a C-state entry, where the core remains for a relatively long time e.g., several seconds or even longer. There is no forced duty cycling on a core inactivated in this way. When the power constraint is relaxed, the OS is allowed to bring the core back online, e.g., through an indication in the same MSR.

Figure 3:
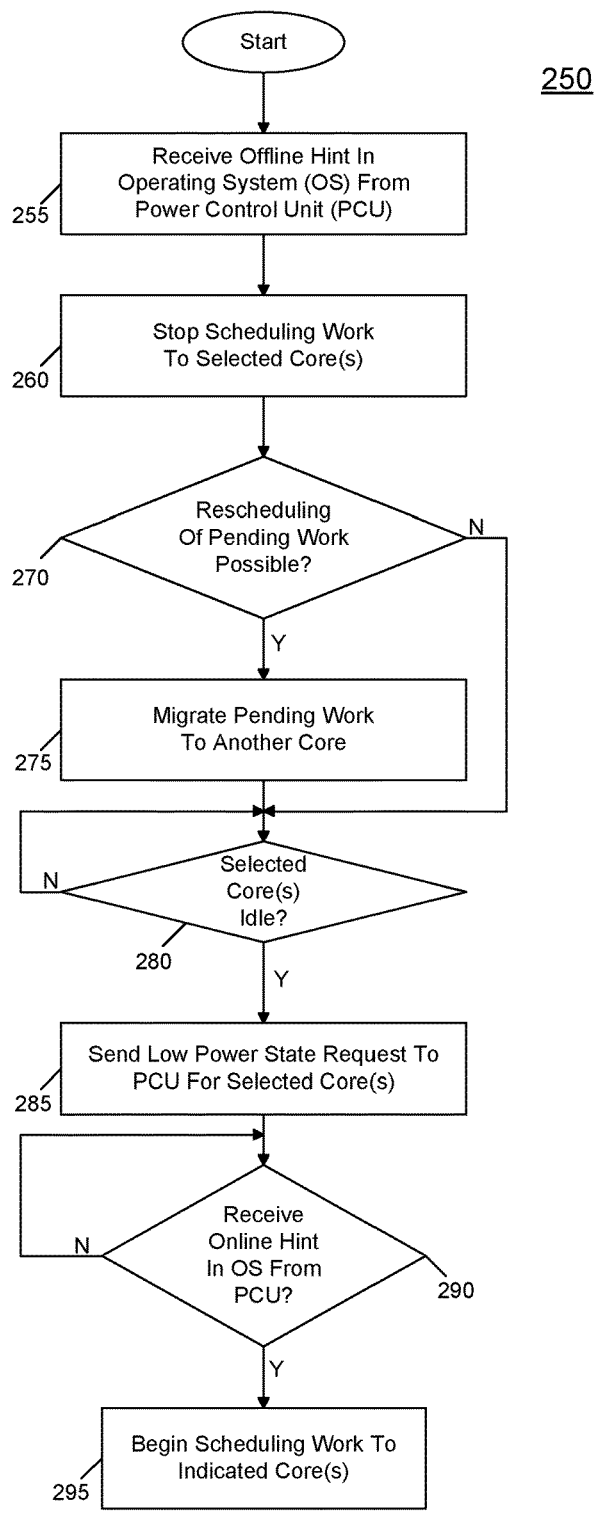
FIG. 3 is a flow diagram of a method for performing core offlining in accordance with an embodiment of the present invention.

Referring now to FIG. 3, shown is a flow diagram of a method for performing OS-based core offlining in accordance with an embodiment of the present invention. As shown in FIG. 3, method 250 may be performed by an OS that is capable of performing core offlining as described herein. As seen, method 250 begins at block 255 by receiving an offline hint in the OS from a power control circuit of a processor, e.g., a PCU. Different types of offline hints may be provided. For example, the offline hint may take the form of an indication of a specific one or more cores to be placed into an offline state. Or the indication may simply be a directive that at least one core is to be placed into an offline state. Responsive to this hint, control passes to block 260 where the OS may stop scheduling work to the selected core.

Note that different types of core offlining implementations are possible, some of which perform more operations in order to enable the core offlining. For example, some OS's may provide for migration of work, e.g., threads, from one core to another. Thus at diamond 270 it can be determined whether rescheduling of pending work is possible. As discussed, this may be based on OS capability which may be enabled/disabled, e.g., under BIOS control. If such rescheduling of work is possible, control passes to block 275 where pending work being performed on the core may be migrated to another core.

In any implementation of core offlining, control passes next to diamond 280 to determine whether the selected core is in an idle state, which may be achieved when no further useful work of a given thread is being executed within the core. When this is achieved, control passes to block 285 where the OS may send a low power state request for the selected core to the PCU. As an example, this low power state request may correspond to an OS-initiated low power state request for the selected core. At this time, the PCU may take actions to cause the selected core to be placed into the appropriate low power state. Note that because this request received from the OS is responsive to the earlier hint from the PCU to the OS, the PCU may cause the core to be placed into a deep low power state, as it is ensured that the OS will not schedule new work to this core for a relatively long time period and thus the PCU may place the core into a deep low power state, enabling greater power conservation. As an example, the core may be placed at least in a C6 state and may remain in this state for at least 0.1 ms and potentially much longer. Thus at this point the selected core is in a C-state and the OS does not consider the core to be present, e.g., when making scheduling and other decisions regarding core utilization.

As further seen in FIG. 3, method 250 continues by determining at diamond 290 whether an online hint is received in the OS from the PCU. This online hint is an indication that one or more cores has exited the low power state and thus again is available for the OS to schedule work to the given core. Thus at block 295 the OS may begin scheduling work to such new online cores. Using the embodiment of FIG. 3, note that it is the processor itself, and not the OS, that controls the selection of cores and entry into (and exit from) a deep low power state based on processor operating conditions (e.g., a power-constrained condition). Although shown at this high level in the embodiment of FIG. 3, understand the scope of the present invention is not limited in this regard.

Power-constrained core-scaling and forced C-state entry are complementary. Taking a core offline may have one-time overhead, and is performed relatively infrequently. However, once a core is taken offline, it has no ongoing overheads to keep it that way. Forced core C-state duty cycling can be done relatively fast. However, this duty-cycling involves a recurring performance overhead since the core has to enter and exit a C-state repeatedly.

Note that the two power saving techniques described herein can be used in a complementary manner. As an example, forced C-state duty cycling can be used to meet a power constraint temporarily until the OS (with its relatively long response time) starts taking cores offline. Or forced C-state duty cycling can be used when the OS does not support taking cores offline due to power constraints. Yet further, forced C-state duty cycling can be used for fast, minute adjustments while coarse adjustments are made by taking cores offline. In some cases, forced C-state duty cycling can add response time latencies due to the C-state exit latency. In these cases, instead taking a core offline and scheduling work only on active cores avoids this penalty.

Figure 4:
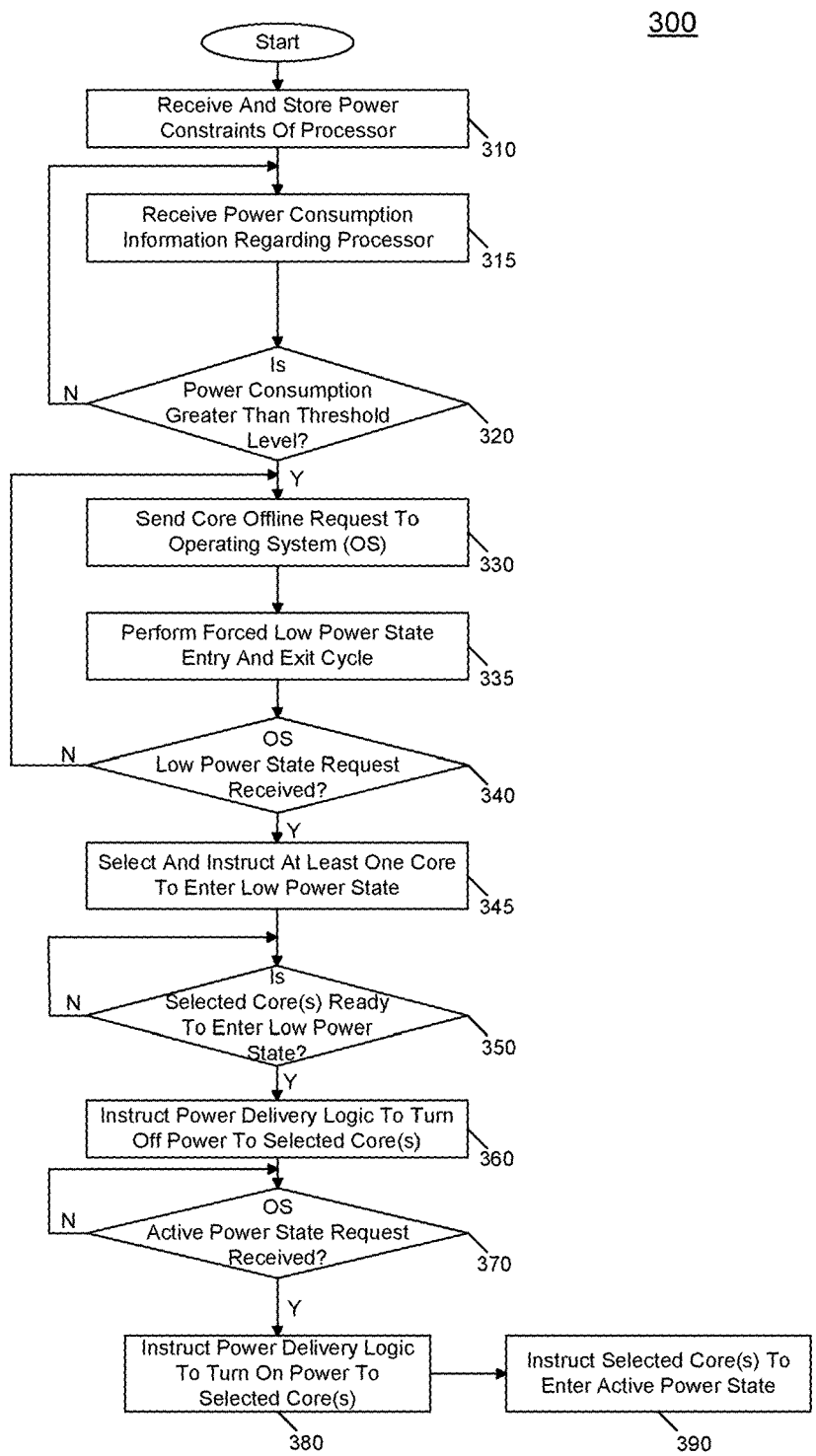
FIG. 4 is a flow diagram of a method for collective forced duty cycling and core scaling in accordance with an embodiment.

Referring now to FIG. 4, shown is a flow diagram of a method for collective forced C-state duty cycling and core scaling in accordance with an embodiment. As shown in FIG. 4, method 300 may be performed by a PCU or other power controller of a processor, and begins by receiving and storing processor power constraints (block 310), such as discussed above with regard to FIG. 2. Then during normal operation power consumption information is received at block 315 and at diamond 320 it is determined whether this power consumption of the processor is greater than a threshold level. If so, control passes to block 330 where a core offline request is sent to the OS. Note that this request may be a generic request for one or more cores to be taken offline or the request can include an indication of one or more selected cores to be taken offline, e.g., based upon their priority, workload or other metric. As described above, there is certain overhead for the OS to have a core taken offline and thus until the process is completed, PCU may perform a forced low power state entry and exit cycle at block 335. At the conclusion of this cycle it can be determined whether a low power state request has been received from the OS (diamond 340). This request thus acts as an indication that the OS has performed its necessary actions in the core offlining process.

Thus at block 345 at least one core is selected and instructed to enter a low power state, which may be a deep low power state such as a C6 state. The PCU may then determine whether the core is ready to enter this low power state at diamond 350. This determination may be based upon an indication from the core that various preparatory actions have been completed prior to entry into the low power state. Next at block 360 power delivery logic may be instructed to turn off power to the selected core. At this time the core is thus in a deep low power state for a relatively long duration, e.g., for a number of milliseconds.

Still referring to FIG. 4, it next may be determined whether an active power state request has been received from the OS for this core (diamond 370). If so, at block 380 the power delivery logic is instructed to turn on power to the selected core and the core enters the active power state at block 390.

Of course other alternatives are possible in this operation that combines forced C-state duty cycling and core scaling. Using a method such as method 300, one or more cores of a multicore processor may be placed in an offline state in which the cores are in a deep low power state and unavailable to the OS for scheduling of threads, while one or more other cores remain in an active state to execute threads without the need for forced C-state operation. For example, an N core processor may be controlled in a power constrained environment to allow M cores to remain fully active to execute threads in a C0 state while N-M cores are placed in a deep low power state and are unavailable for scheduling by the OS.

Figure 5:
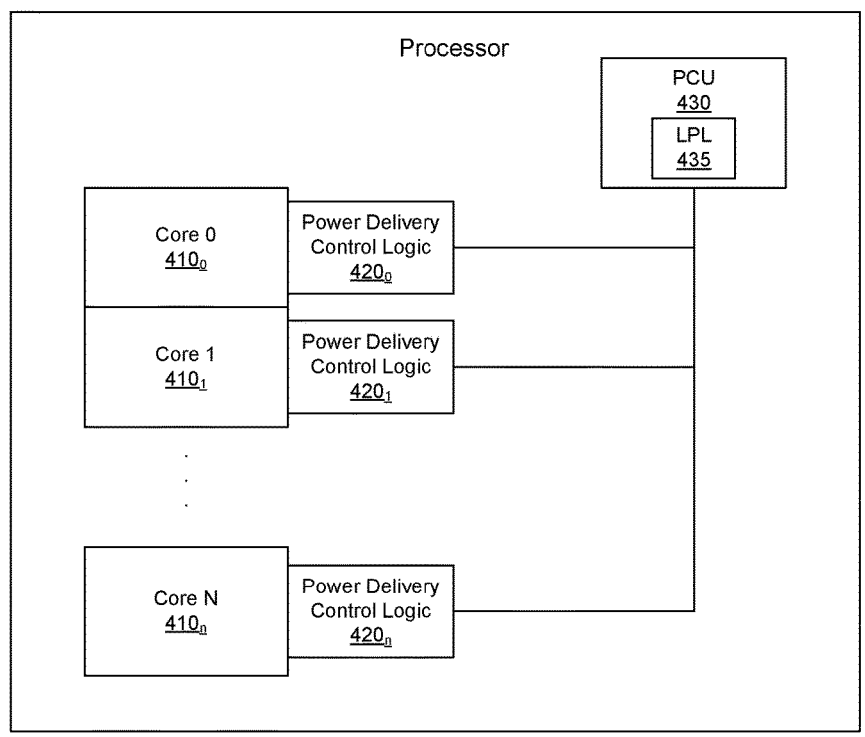
FIG. 5 is a block diagram of a multicore processor in accordance with an embodiment.

Referring now to FIG. 5, shown is a block diagram of a multicore processor in accordance with an embodiment. As shown in FIG. 5, processor 400 includes a plurality of cores $410_0$-$410_n$. Each core may independently execute instructions, e.g., of different threads or of the same thread. Coupled to each core is a power delivery control logic $420_0$-$420_n$. In various embodiments, this power delivery control logic may be implemented via power gates or as an integrated per-core voltage regulator.

Still referring to FIG. 5, each power delivery control logic 420 is coupled to a PCU 430 that includes a low power logic 435 in accordance with an embodiment. In general, PCU 430 may be implemented as an on-die microcontroller to control power management for the processor. PCU 430 is programmed with the power constraints for the processor, many of which can be changed by the user dynamically (for example, through configuration registers or sideband communication). PCU 430 is also aware of the power consumption of the processor. Logic 435, which may be implemented as hardware, software, firmware, software or combinations thereof, monitors the power consumption versus the constraints and determines power management actions to take, including forced C-state duty cycling and core scaling as described herein.

In forced core C-state entry, PCU 430 makes a power management decision (based on constraints and current operating point) to reduce power. PCU 430 sends a signal to the selected core 410 to cause execution to be suspended on the running thread, take any other housekeeping actions (such as saving core state), and then turn off power to the core through corresponding power delivery control logic 420. After a predetermined time interval, it then wakes up the core through a C-state exit and allows core execution to proceed. This forced C-state cycle may occur rapidly (up to several times per ms).

The ratio between the on-time and the off-time of the core determines the level of available performance as well as the power reduction. This ratio (or duty cycle) may be modulated by PCU 430 based on the power/performance level required. When multiple cores are being duty cycled, the on time can be coordinated and staggered across cores to limit the number of cores that are simultaneously active and thus reduce the short-term power draw. Note that this forced C-state control differs from conventional C-state operation in which a core C-state is entered when the core requests C-state entry due to a lack of workload, and the PCU responds to that request by taking any housekeeping actions and then sending a command to the core power delivery control logic to remove power from the core. In this conventional C-state operation the core C-state is exited when a timer, interrupt, OS thread start or other event requests the core. Here, the forced C-state exit occurs under control of the PCU, e.g., after a predetermined time interval has passed, removal of a power-constrained condition or so forth.

Figure 6:
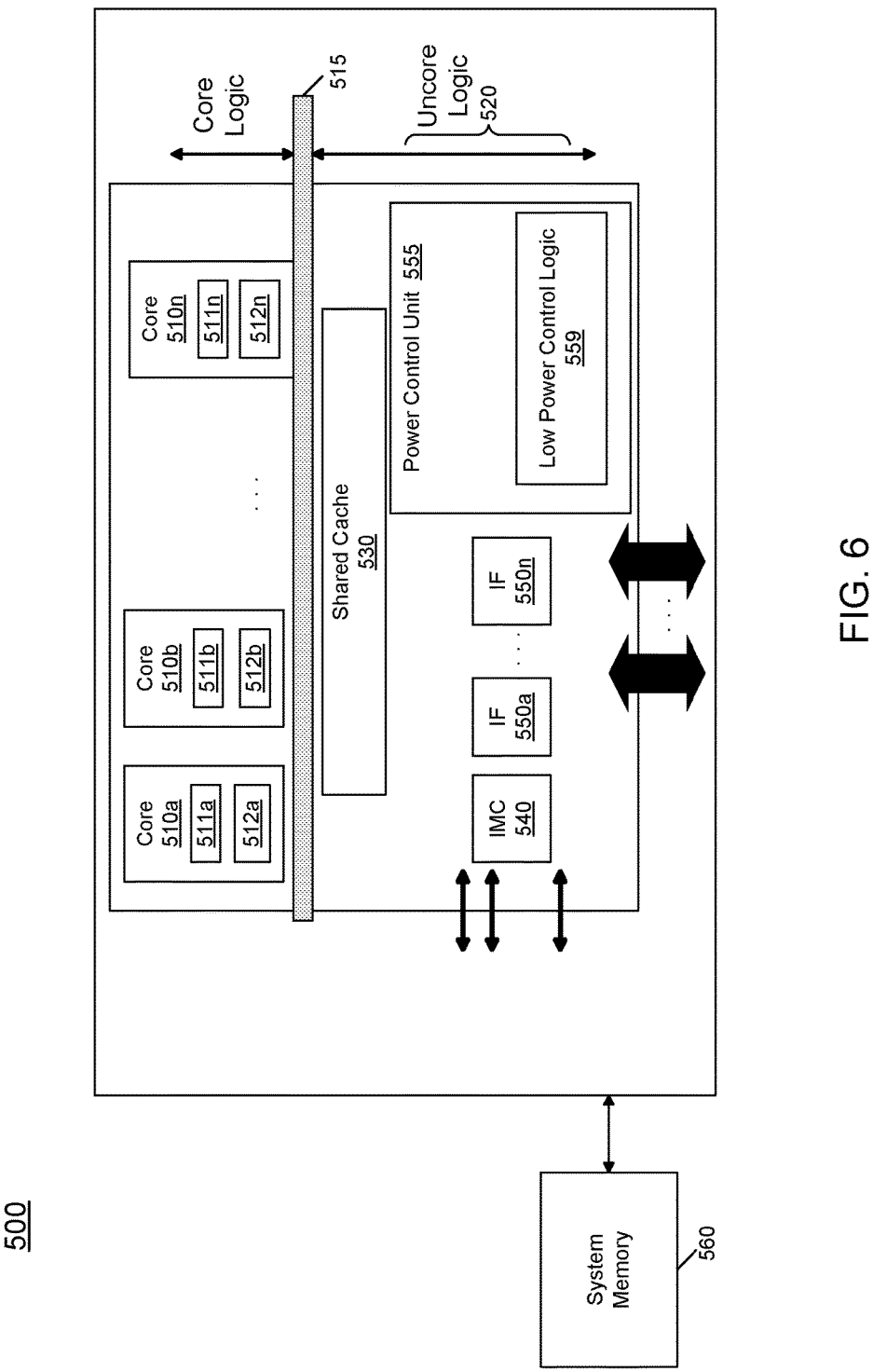
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 500 may be a multicore processor including a plurality of cores $510_a$-$510_n$. In one embodiment, each such core may be of an independent power domain and can be configured to enter and exit active states and/or maximum performance states based on workload. The various cores may be coupled via an interconnect 515 to a system agent or uncore 520 that includes various components. As seen, the uncore 520 may include a shared cache 530 which may be a last level cache. In addition, the uncore may include an integrated memory controller 540, various interfaces 550 and a power control unit 555. In various embodiments, power control unit 555 may include a low power control logic 559 in accordance with an embodiment of the present invention. Using this logic, one or more cores may be forced to transition to a C-state as described herein. Low power control logic 559 also may initiate core offlining as described.

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
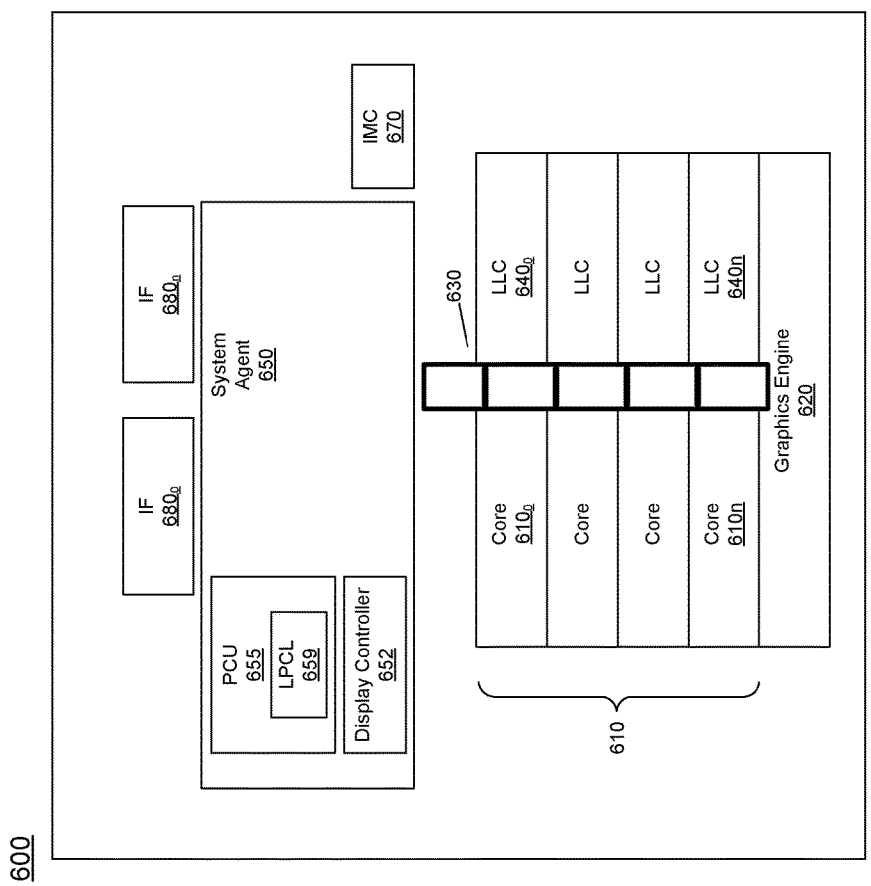
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 600 includes multiple domains. Specifically, a core domain 610 can include a plurality of cores $610_0$-$610_n$, a graphics domain 620 can include one or more graphics engines, and a system agent domain 650 may further be present. In some embodiments, system agent domain 650 may execute at an independent frequency than the core domain and may remain powered on at all times to handle power control events and power management such that domains 610 and 620 can be controlled to dynamically enter into and exit high power and low power states. Each of domains 610 and 620 may operate at different voltage and/or power. Note that while only shown with three domains, understand the scope of the present invention is not limited in this regard and additional domains can be present in other embodiments. For example, multiple core domains may be present each including at least one core.

In general, each core 610 may further include low level caches in addition to various execution units and additional processing elements. In turn, the various cores may be coupled to each other and to a shared cache memory formed of a plurality of units of a last level cache (LLC) $640_0$-$640_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain.

As further seen, system agent domain 650 may include display controller 652 which may provide control of and an interface to an associated display. As further seen, system agent domain 650 may include a power control unit 655 which can include a low power control logic 659 in accordance with an embodiment of the present invention to force one or more cores to transition into and out of C-states even while the cores are undertaking active workloads. Logic 659 also may initiate core offlining to remove one or more cores from an OS view, rendering them unavailable for scheduling, thus realizing processor-controlled core scaling, e.g., based on power constraints. In various embodiments, this logic may execute the algorithms described above in FIGS. 2 and 4.

As further seen in FIG. 7, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
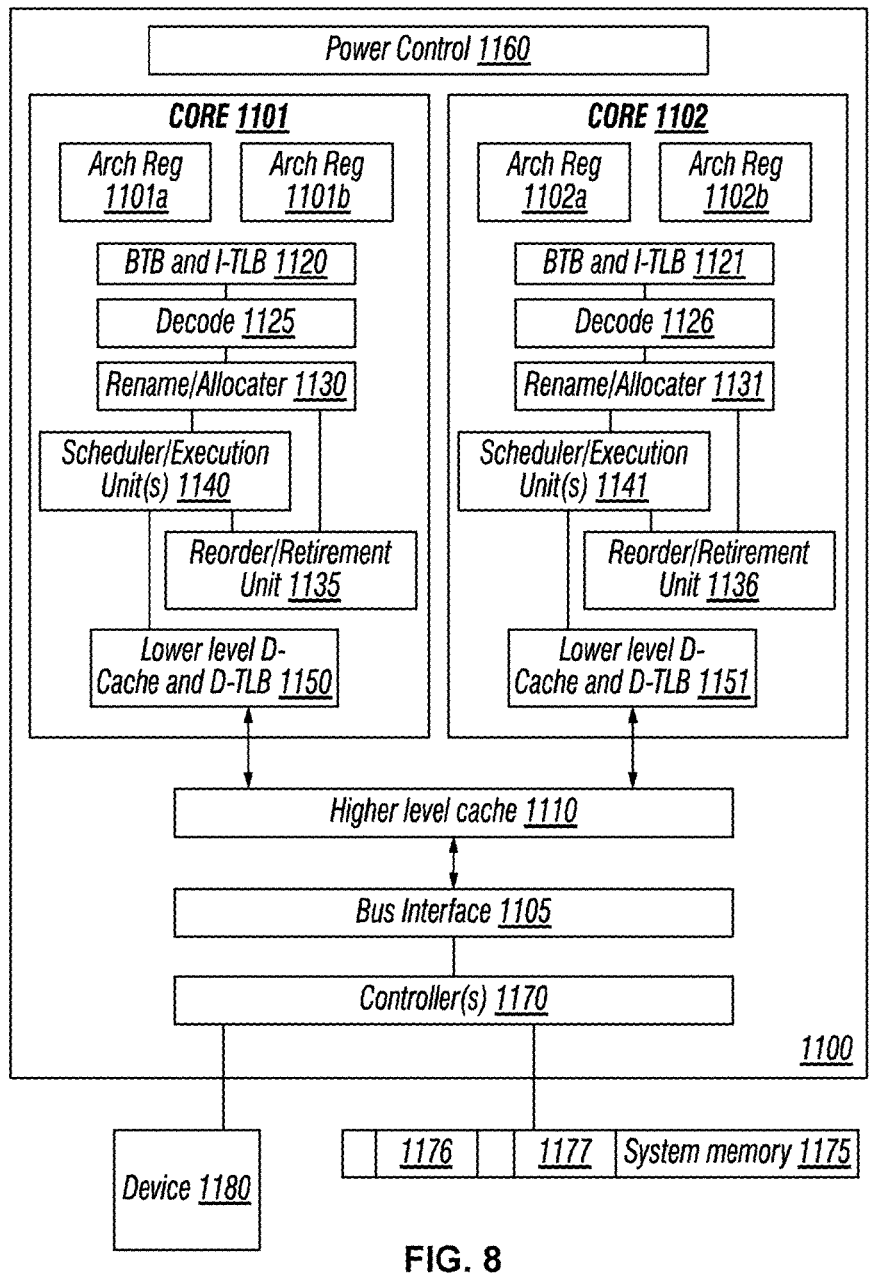
FIG. 8 is an embodiment of a processor including multiple cores.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller (s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 9:
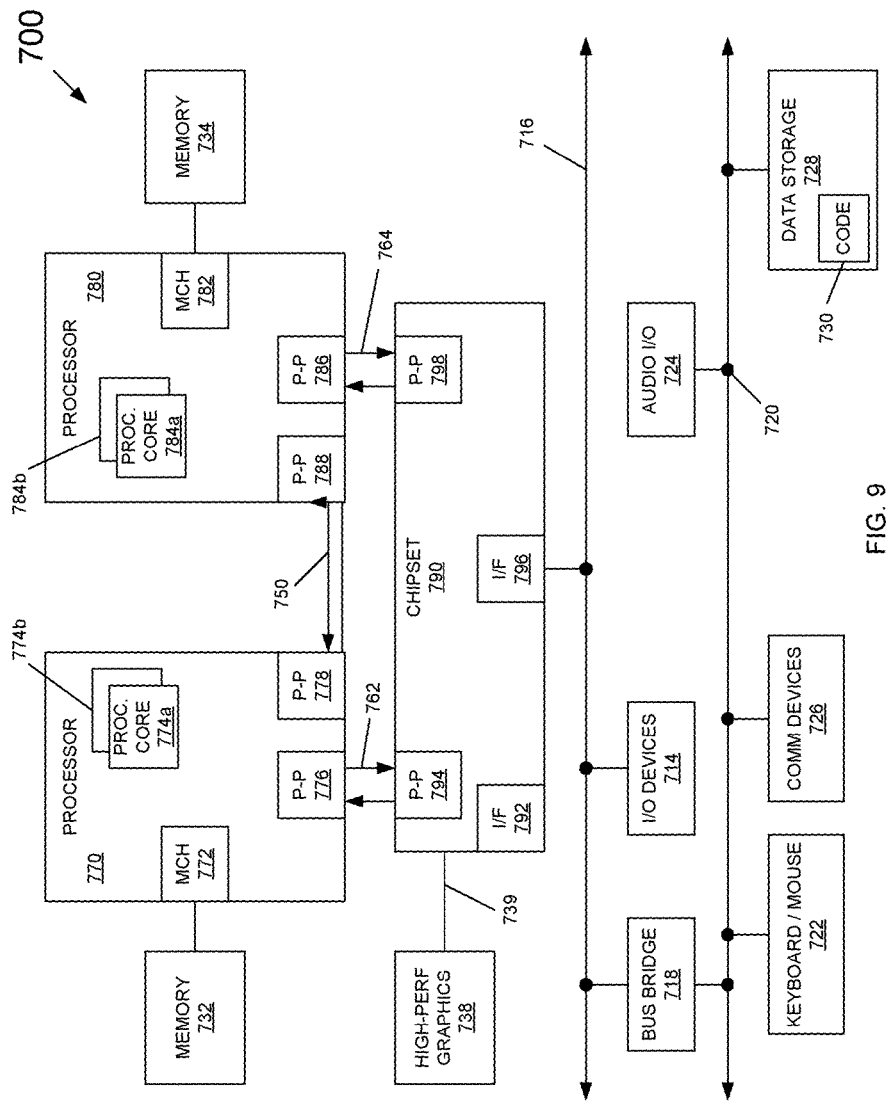
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 700 is a point-to-point interconnect system, and includes a first processor 770 and a second processor 780 coupled via a point-to-point interconnect 750. As shown in FIG. 9, each of processors 770 and 780 may be multicore processors, including first and second processor cores (i.e., processor cores 774a and 774b and processor cores 784a and 784b), although potentially many more cores may be present in the processors. Each of the processors can include a PCU or other logic to perform forced C-state transitions and core offlining, as described herein.

Still referring to FIG. 9, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 9, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 9, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 9, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

The following examples pertain to further embodiments.

In one example, a processor comprises a plurality of cores each to independently execute instructions, a power delivery logic coupled to the plurality of cores, and a power controller including a first logic to cause a first core of the plurality of cores to enter into a first low power state of an OSPM scheme independently of the OS, during execution of at least one thread on the first core.

In an embodiment, the first logic is to send a first low power force signal to the first core to cause the first core to prepare for entry into the first low power state during the at least one thread execution. The first logic may further send a second low power force signal to the power delivery logic to cause the power delivery logic to turn off power to the first core after the first core is prepared for the entry. The first core may enter the first low power state transparently to the OS and without a low power state request from the OS.

In an example, the first logic is to cause the first core to enter into the first low power state when a power consumption level of the processor is greater than a first threshold, to cause the first core to enter into the first low power state for a first time interval, and to thereafter cause the first core to exit the first low power state independently of the OS. The first logic may modulate a duty cycle of the first low power state entry and exit, based on a requested performance level. The first logic may further coordinate the first low power state entry and exit of the plurality of cores to maintain at least a threshold number of the plurality of cores in an active state.

In an embodiment, the first logic is to cause the first core to enter into the low power state when the processor is operating at a minimum voltage level, and to send an offline signal to the OS to cause the OS to stop scheduling of work to a second core of the plurality of cores. Also, the first logic may cause the second core to enter into the first low power state responsive to a low power state request received from the OS after the offline signal is sent to the OS. The first logic is thereafter, responsive to a power consumption level of the processor being below a threshold level, to send an online signal to the OS to cause the OS to start scheduling of work to the second core.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method comprises: sending a core offline request to an OS from a power controller of a processor responsive to a power consumption level of the processor being greater than a threshold level, the offline request to cause the OS to stop scheduling work to at least one core of the processor; receiving a low power state request in the power controller from the OS; and responsive to the low power state request, causing the at least one core to enter into the low power state.

In an example, the method further comprises instructing a power delivery circuit associated with the at least one core to turn off power to the at least one core, where the low power state comprises a deep low power state.

In an example, sending the offline request includes writing, by the power controller, a hint value in a first field of a first storage corresponding to a first core to indicate that the first core is to enter the low power state, where the first storage is accessible to the OS.

In an example, the method includes sending an online request from the power controller to the OS to initiate an exit of the low power state, and thereafter receiving an active power state request from the OS.

In an example, sending the online request includes writing, by the power controller, a second hint value in the first field of the first storage to indicate that the first core is to exit the low power state.

In another example, a system comprises: a processor including a plurality of cores each to independently execute instructions and a power control means including a low power logic that, responsive to a determination that a power consumption level of the processor has exceeded a first threshold, is to initiate a low power state entry of a first core of the plurality of cores during execution of a thread on the first core, and to send an offline request to an OS to cause the OS to terminate thread scheduling to the first core for at least a first time duration to scale a number of cores of the plurality of cores available to the OS; a voltage regulator coupled to the processor; and a DRAM coupled to the processor.

In one example, the power control means is to send a first control signal to the voltage regulator to cause the voltage regulator to not provide an operating voltage to the first core during the low power state. The power control means may cause the first core to enter and exit a plurality of forced low power states before one or more threads scheduled to the first core are completed. After the one or more threads are completed, the power control means may cause the first core to enter into the low power state responsive to a low power state request received from the OS and to maintain the first core in the low power state for at least the first time duration. The power control means may select the first core for entry into the low power state based at least in part on a priority level of the first core.

In an example, an apparatus comprises means to perform a method according to any of the above examples.

In another example, a machine-readable storage medium includes machine-readable instructions, when executed, to implement a method according to any of the above examples.

Understand that various combinations of the above examples are possible.

Figure 10:
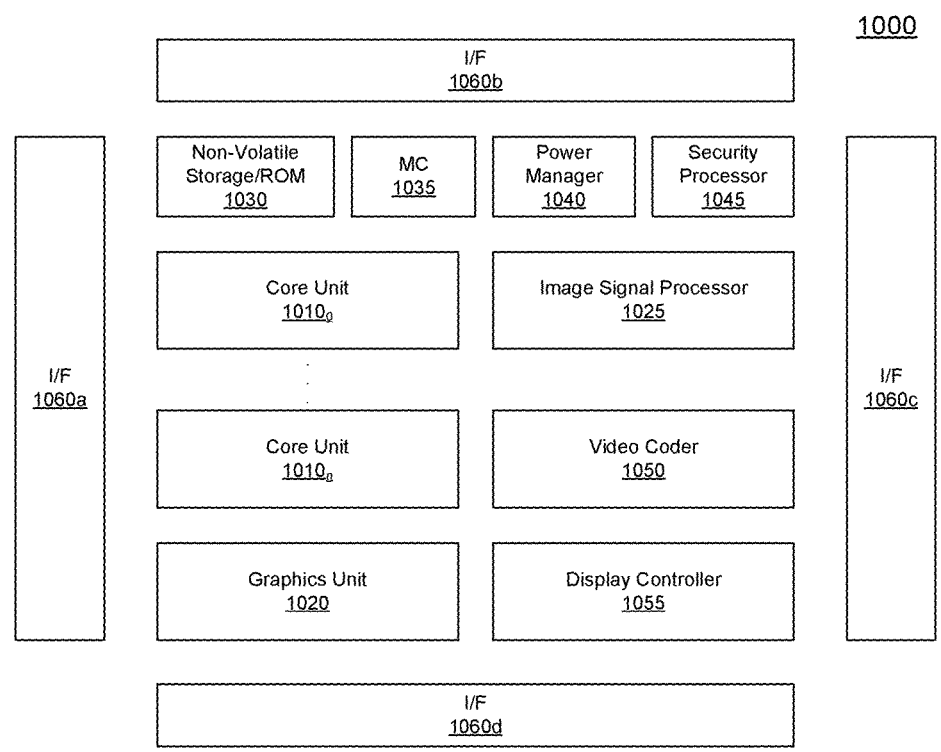
FIG. 10 is a block diagram of a processor in accordance with another embodiment of the present invention.

Referring now to FIG. 10, shown is a block diagram of a processor in accordance with an embodiment of the present invention. In the embodiment of FIG. 10, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 10, processor 1000 includes a plurality of core units $1010_0$-$1010_n$. Each core unit may include one or more processor cores, one or more cache memories and other circuitry, and may include monitor logic and restriction logic as described herein. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 830 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 10).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 10, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform forced low power state transitions of cores handling active workloads, as well as removing cores from OS visibility to realize dynamic scaling, e.g., due to power constraints.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I²C, UART, MIPI, SDIO, DDR, SPI, HDMI, among other types of communication protocols. Although shown at this high level in the embodiment of FIG. 10, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a semiconductor die comprising:
a plurality of cores;
a plurality of integrated voltage regulators coupled to the plurality of cores; and
a power controller including a first hardware logic to cause, in response to a power consumption level of the processor that exceeds a threshold level, a first core of the plurality of cores to enter into a first inactive low power state of an operating system power management (OSPM) scheme independently of and transparently to the OS, during execution of at least one thread on the first core and without a request from the first core, wherein the first hardware logic is to send a first low power force signal to the first core to cause the first core to prepare for entry into the first inactive low power state during the at least one thread execution and send a second low power force signal to a first voltage regulator of the plurality of integrated voltage regulators to cause the first voltage regulator to be turned off after the first core is prepared for the entry into the first inactive low power state.

2. The processor of claim 1, wherein the first hardware logic is to send an offline signal to the OS to cause the OS to stop scheduling of work to a second core of the plurality of cores.

3. The processor of claim 2, wherein the processor comprises a register to store an indication that the second core is to be taken offline.

4. The processor of claim 1, wherein the power controller is to cause the first core to enter the first inactive low power state without receipt of a low power state request from the OS.

5. The processor of claim 1, wherein the first hardware logic is to cause the first core to enter into the first inactive low power state for a predetermined time interval and thereafter exit the first inactive low power state transparently to the OS.

6. The processor of claim 5, wherein the first hardware logic is to modulate a duty cycle of the first inactive low power state entry and exit, based on a requested performance level.

7. The processor of claim 6, wherein the first hardware logic is to coordinate the first inactive low power state entry and exit of the plurality of cores to maintain at least a threshold number of the plurality of cores in an active state.

8. The processor of claim 2, wherein the first hardware logic is to cause the second core to enter into the first inactive low power state responsive to a low power state request received from the OS after the offline signal is sent to the OS.

9. The processor of claim 8, wherein the first hardware logic is, in response to the power consumption level of the processor that is below the threshold level, to send an online signal to the OS to cause the OS to start scheduling of work to the second core.

10. The processor of claim 1, wherein the power controller comprises a microcontroller.

11. A non-transitory machine-readable medium having stored thereon instructions, which if performed by a machine cause the machine to perform a method comprising:
   sending, from a power controller of a processor, a core offline request to an operating system (OS) in response to a power consumption level of the processor exceeding a threshold level, the core offline request to cause the OS to stop scheduling work to at least one core of the processor;
   thereafter receiving, in the power controller, a low power state request from the OS; and
   responsive to the low power state request, causing the at least one core to enter into the low power state comprising an offline state, and maintaining the at least one core in the low power state for at least a first time duration.

12. The non-transitory machine-readable medium of claim 11, wherein the method further comprises instructing a power delivery circuit associated with the at least one core to turn off power to the at least one core.

13. The non-transitory machine-readable medium of claim 11, wherein the method further comprises:
   maintaining at least two cores of the processor in the offline state; and
   enabling two or more other cores of the processor to be in an active state.

14. A system comprising:
   a processor including a plurality of cores, one or more internal voltage regulators, and a power controller, responsive to a determination that a power consumption level of the processor has exceeded a first threshold, to initiate entry of a first core of the plurality of cores into a low power state during execution of a thread on the first core, and to send an offline request to an operating system (OS) to cause the OS to terminate thread scheduling to the first core for at least a first time duration to scale a number of cores of the plurality of cores available to the OS, wherein after the first thread is completed, the power controller is cause the first core to enter into the low power state responsive to a low power state request received from the OS after the offline request is sent to the OS, and maintain the first core in the low power state for at least the first time duration;
   an external voltage regulator coupled to the processor; and
   a dynamic random access memory (DRAM) coupled to the processor.

15. The system of claim 14, wherein the power controller is to send a first control signal to a first internal voltage regulator of the one or more internal voltage regulators to cause the first internal voltage regulator to not provide an operating voltage to the first core during the low power state.

16. The system of claim 14, wherein the power controller is to cause the first core to enter and exit a plurality of forced low power states before one or more threads scheduled to the first core are completed.

17. The system of claim 14, wherein the power controller is to select the first core for entry into the low power state based at least in part on a priority level of the first core.

* * * * *